United States Patent [19]
Powell

[11] 3,934,478
[45] Jan. 27, 1976

[54] MAGNET SHAFT ASSEMBLY FOR SPEEDOMETER AND ODOMETER

[75] Inventor: Patrick L. Powell, Franklin Park, Ill.

[73] Assignee: Stewart-Warner Corporation, Chicago, Ill.

[22] Filed: Nov. 28, 1973

[21] Appl. No.: 419,519

[52] U.S. Cl. ................................. 73/519
[51] Int. Cl.² ............................... G01P 3/49
[58] Field of Search .............. 73/490, 519, 520

[56] References Cited
UNITED STATES PATENTS

| | | |
|---|---|---|
| 3,111,037 | 11/1963 | Wallis, Jr. .............. 73/519 |
| 3,517,561 | 6/1970 | Holbrook ............... 73/519 |
| 3,693,459 | 9/1972 | Powell .................... 73/519 |

FOREIGN PATENTS OR APPLICATIONS

| | | |
|---|---|---|
| 1,947,971 | 4/1971 | Germany ............... 73/519 |

Primary Examiner—James J. Gill

[57] ABSTRACT

A speedometer magnet shaft assembly having a plastic magnet shaft and integrally formed annular wall moldably secured to the magnet and flux collector. A helical gear is moulded on the annular wall for transmitting movement to the odometer. The molded magnet shaft also has a recess formed therein at each end and a peripheral recess formed therein intermediate the ends. The end recesses receive the speedometer pointer shaft and flexible shaft ends, respectively. The peripheral recess receives a portion of the speedometer frame bracket to prevent axial movement of the magnet shaft.

12 Claims, 7 Drawing Figures

U.S. Patent   Jan. 27, 1976   3,934,478
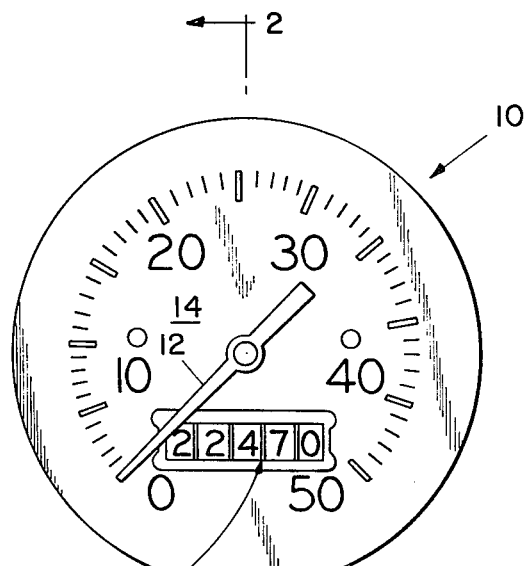
FIG.1
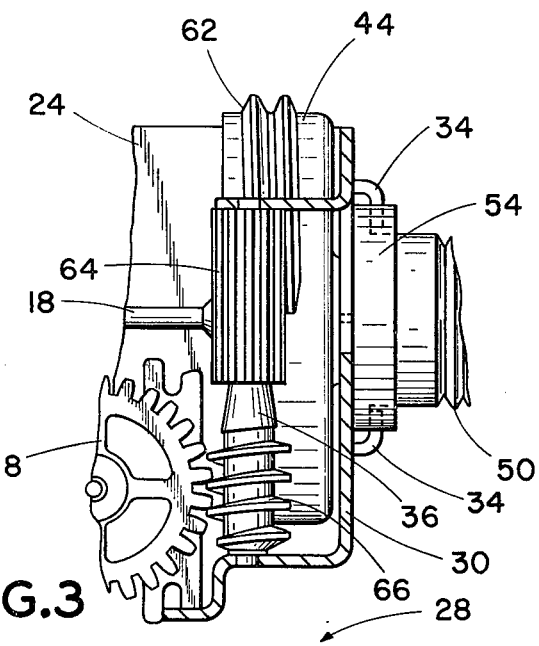
FIG.3
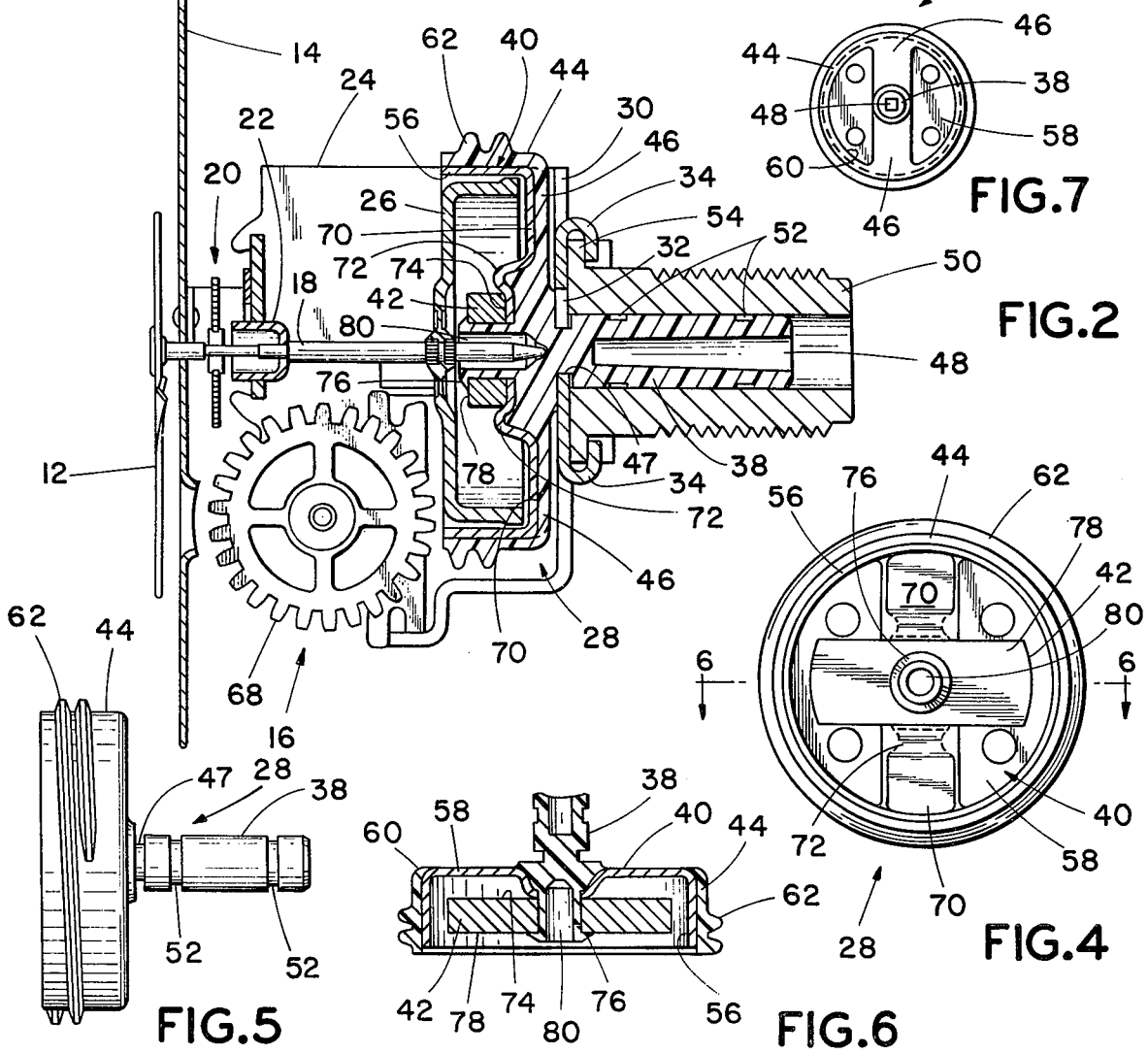
FIG.2
FIG.7
FIG.5
FIG.6
FIG.4

MAGNET SHAFT ASSEMBLY FOR SPEEDOMETER AND ODOMETER

BACKGROUND OF THE INVENTION

1. Field of the Invention

This invention relates in general to an improved and more economical magnet shaft assembly for operating a speedometer and an odometer.

2. Brief Summary of the Prior Art

Speedometer and odometer assemblies incorporate a magnet shaft usually of bronze having a noncircular axially extending recess at one end. The recess receives the correspondingly shaped flexible shaft end that rotates the magnet shaft. The other magnet shaft end has a magnet and flux collector staked thereon and usually is provided with another recess for journaling one end of the speedometer pointer shaft.

The magnet shaft, in addition, must be provided with means to prevent axial movement when mounted in the speedometer boss. A helical gear is also formed on the magnet shaft or on the flux collector to transmit movement to the odometer, as, for example, shown in U.S. Pat. Nos. 3,693,459 and 3,768,315.

As may be appreciated, numerous steps are involved in the above described assembly, several of which are usually performed manually, and consequently the assembly is relatively expensive. Additionally, the parameters of each assembly may vary widely to in turn render operation variable or inaccurate.

SUMMARY OF THE INVENTION

The present invention utilizes a plastic magnet shaft and annular wall moldably secured to the magnet and flux collector to provide greater economy, accuracy and uniformity. Thus, by eliminating the staking of the magnet and flux collector to the magnet shaft, a reduction in variations between assemblies is secured, together with reduced handling. Likewise, the simultaneous provision of appropriately sized axial recesses in the magnet shaft ends, during molding for receiving the flexible shaft and pointer shaft ends, provides both greater accuracy and eliminates any additional steps in forming the recesses. A deep recess in the axial end of the magnet shaft receiving the flexible shaft can thus be facilely formed to enable use of a longer squared tip on the flexible shaft and ensure good coupling therebetween, despite variations in the flexible shaft. Molding also enables the simultaneous provision of a peripheral recess in the plastic magnet shaft to enable the magnet shaft to be retained against axial movement when assembled in the speedometer.

A number of helical gear teeth are also molded on the periphery of the magnet shaft annular wall to provide improved transmission and eliminate the need for one cross shaft and respective gears between the magnet shaft and odometer, as described in the aforementioned patents. Molded plastic teeth, in addition to providing more accurate and reproducible gear teeth, contribute to longer gear life.

Besides the just described advantages, the molded plastic reduces noise normally resulting from movement between mating gear teeth and between metal shafts.

It is therefore a primary object of the present invention to provide an improved and more economical magnet shaft assembly for a speedometer and odometer.

Other objects and features of the present invention will become apparent on examination of the following specification, claims and accompanying drawings.

BRIEF DESCRIPTION OF THE DRAWINGS

FIG. 1 is a front elevational view of a speedometer and odometer assembly incorporating the principles of the present invention;

FIG. 2 is a sectional view taken generally along the line 2—2 in FIG. 1 with the housing omitted;

FIG. 3 is a fragmentary side elevational view similar to FIG. 2 showing the odometer drive arrangement;

FIG. 4 is a front elevational view of the magnet shaft assembly;

FIG. 5 is a side elevational view of the magnet shaft assembly;

FIG. 6 is a sectional view taken along the line 6—6 in FIG. 4; and

FIG. 7 is a rear view of the magnet shaft assembly.

DESCRIPTION OF THE PREFERRED EMBODIMENT

In FIG. 1 a speedometer and odometer assembly for use in a vehicle is indicated by the reference character 10, with the conventional bezel, lens and housing for the assembly omitted. The assembly 10 includes a speedometer pointer 12 for movement along a dial 14 marked with indicia for indicating vehicle speed. Dial 14 is provided with an opening through which an odometer 16 is seen having a plurality of conventional arranged dials marked for indicating the distance traveled.

The pointer 12 is secured on one end of a pointer shaft 18, seen in FIGS. 2 and 3, which extends through a torsion spring assembly 20, serving to bias the pointer shaft 18 and pointer 12 to a zero position relative the dial indicia. Shaft 18 extends through a bearing 22 carried in a cross plate or bracket located between the end legs of a U-shaped speedometer frame bracket 24 and carries a conventional speed cup 26. The speed cup 26, together with the pointer shaft 18 and pointer 12, are conventionally rotated in response to the rotation of a magnet shaft assembly 28, to be described.

The dial 14 and odometer 16 are also supported between the end legs of frame bracket 24, whose back leg 30, as described in the aforementioned patents, is provided with a central opening 32, integrally formed tangs 34, and a depending leg, which engages odometer brackets and rotatably supports one end of an odometer cross shaft 36.

The magnet shaft assembly 28 comprises a molded plastic magnet shaft 38, a generally cup-shaped flux collector 40, and a bar magnet 42. The shaft 38 passes through central opening 32 and has an annular wall 44 spaced radially outwardly of the shaft 38 and integrally interconnected with one end of shaft 38 by means of radial walls 46. A peripheral recess 47 is formed in the outer surface of the shaft 38 adjacent the juncture with the radial walls 46 for receiving an edge portion of the central opening 32 to hold the shaft 38 against axial movement.

The shaft 38 has an axially extending noncircular recess or opening 48 at one end for receiving the noncircular or squared end of a flexible shaft or coupling tip (not shown) that rotates the shaft 38 in a bearing boss 50. A pair of axially spaced peripheral recesses 52 are also formed in shaft 38, as seen in FIGS. 2 and 5, for retaining a lubricant.

The boss 50 has a threaded exterior surface for receiving the flexible shaft casing ferrule nut (not shown) and flange 54 at one end for abutment against leg 30 of the frame bracket. The flange 54 has recesses for receiving the tangs 34 to secure the boss 50 against frame bracket leg 30.

The flux collector cup 40 is formed of magnetically susceptible metal and has a rim or annular wall 56 and a radial wall 58, as seen in FIGS. 4, 6 and 7. Annular wall 56 is spaced outwardly of the rim wall of speed cup 26. The magnet shaft annular wall 44 is molded about the exterior surface of rim wall 56, with an annular lip 60 on wall 44 extending partially over the rear surface of wall 58.

Peripheral helical gear teeth 62 are molded on the outer periphery of annular wall 44. Teeth 62 engage the teeth of a worm gear 64 on shaft 36, journaled at the adjacent end in a tang extending from leg 30, as seen in FIG. 3. A helical gear 66, formed on shaft 36, engages the conventional odometer pinion gear 68 of the odometer 16 to drive the odometer dials in response to rotation of the magnet shaft 38 and helical gear teeth 62.

The flux collector back or radial wall 58 has a pair of diametrically opposed radially extending axially offset walls 70, which form channels or recesses in which the plastic radial walls 46 of the magnet shaft 38 are molded.

Channel walls 70 are each further provided with an additional axially offset portion 72, extending axially in the direction of cup 26. Each portion 72 has a folded back wall in overlapping engagement with a respective radially spaced face or wall of bar magnet 42, and terminating in engagement with the rear axial face or wall 74, of the magnet to provide a desirable magnetic circuit. The offset portion 72 defines a deep recess which is filled by a thickened portion of radial walls 46 adjacent the corresponding end of shaft 38.

Shaft 38, at the end adjacent the flux collector, extends through a central aperture in magnet 42 in the direction of cup 26 and terminates in a radial wall 76 engaged with the front face or wall 78 of the bar magnet. Offset portions 72 orient the magnet relative the flux collector, and together with the engaged transverse wall sections 44 and 70, prevent relative rotation between the shaft 38, the flux collector, and the magnet. The portion of shaft 38 extending through the central opening in the bar magnet is provided with a central recess or opening 80 for journaling the adjacent end of the pointer shaft 18.

In molding the magnet assembly, the magnet 42, together with cup 40 having locating holes in its back wall, are set in adjacent axial positions in the mold. The plastic, preferably nylon, is injected into the mold to simultaneously, accurately and reproducibly form shaft 38, the recesses 47, 48, 52 and 80 together with radial walls 46 and 76, the annular wall 44, and gear teeth 62. As the plastic sets, it moldably bonds or moldably secures the shaft 38 to the collector 40 and magnet 42.

In operation, the magnet 42 and the collector annular wall 56 complete a magnetic circuit through the rim wall of the aluminum speed or eddy cup 26 to rotate cup 26 in response to the rotation of shaft 38 by a flexible shaft coupled in recess 48. This rotates the pointer 12 against the bias of spring 20 to move the pointer to a position corresponding to the speed of shaft 38. Simultaneously, teeth 62 rotate worm wheel 64 and helical gear 66 to in turn move the pinion gear 68 and the odometer dials through a distance corresponding to vehicle travel.

It will be noted that the plastic radial walls 46 filling the channels formed by the collector axially offset walls 70 and 72, prevent relative movement therebetween despite the load on the gear teeth 62. It will be further noted that the openings or recesses 48 and 80 are facilely formed to a considerable depth. In the case of recess 48, this permits a desirable improvement in the length of coupling between the corresponding flexible shaft end and the shaft 38.

Various modifications of the described magnet shaft assembly can be constructed without departing from the disclosed inventive concepts, which are set forth in the accompanying claims.

What is claimed is:

1. An improved magnet shaft assembly for use in rotating a speedometer speed cup having a rim wall, comprising a metal flux collector having an axially extending portion spaced radially outwardly of said speed cup rim wall, a bar magnet spaced radially inwardly of said rim wall, and a molded plastic magnet shaft having an integrally formed portion adjacent one end in molded engagement with said flux collector including the axially extending portion and bar magnet for securing said magnet and collector to said magnet shaft.

2. An improved magnet shaft assembly for use in rotating a speedometer speed cup having a rim wall, comprising a metal flux collector having an annular portion spaced radially outwardly of said speed cup rim wall and a radial wall having an axially offset wall portion, a bar magnet spaced radially inwardly of said speed cup rim wall and engaged with said flux collector radial wall, a molded plastic magnet shaft extending through said flux collector radial wall and said magnet and in molded engagement with said magnet to resist movement therebetween, a radially extending wall integrally formed on said magnet shaft and in molded engagement with said flux collector axially offset wall portion to resist relative rotation therebetween, and an anular wall portion integrally formed on said magnet shaft radial wall and in molded engagement with said flux collector annular portion.

3. An improved magnet shaft assembly for use in rotating a speedometer speed cup having a rim wall, comprising a metal flux collector having an annular portion spaced radially outwardly of said speed cup rim wall and a radial wall having an axially offset wall portion, a bar magnet spaced radially inwardly of said speed cup rim wall and engaged with said flux collector radial wall, a molded plastic magnet shaft extending through said flux collector radial wall and said magnet and in molded engagement with said magnet to resist movement therebetween, a radially extending wall integrally formed on said magnet shaft and in molded engagement with said flux collector axially offset wall portion to resist relative rotation therebetween, and an annular wall portion integrally formed on said magnet shaft radial wall and in molded engagement with said flux collector annular portion, and a helical gear integrally formed on said magnet shaft annular wall portion.

4. An improved magnet shaft assembly for use in rotating a speedometer speed cup having a rim wall, comprising a metal flux collector having an annular portion spaced radially outwardly of said speed cup rim wall and a radial wall having an axially offset wall portion, a bar magnet spaced radially inwardly of said speed cup rim wall and engaged with said flux collector radial wall, a molded plastic magnet shaft extending through said flux collector radial wall and said magnet and in molded engagement with said magnet to resist movement therebetween, a radially extending wall integrally formed on said magnet shaft and in molded engagement with said flux collector axially offset wall portion to resist relative rotation therebetween, and an annular wall portion integrally formed on said magnet shaft radial wall and in molded engagement with said flux collector annular portion, said magnet shaft having an opening at opposite ends for engagement with a pointer shaft and flexible shaft respectively.

5. An improved magnet shaft assembly for use in rotating a speedometer speed cup having a rim wall, comprising a metal flux collector having an annular portion spaced radially outwardly of said speed cup rim wall and a radial wall having an axially offset wall portion, aa bar magnet spaced radially inwardly of said speed cup rim wall and engaged with said flux collector radial wall, a molded plastic magnet shaft extending through said flux collector radial wall and said magnet and in molded engagement with said magnet to resist movement therebetween, a radially extending wall integrally formed on said magnet shaft and in molded engagement with said flux collector axially offset wall portion to resist relative rotation therebetween, and an annular wall portion integrally formed on said magnet shaft radial wall and in molded engagement with said flux collector annular portion, said flux collector axially offset wall portion engaging spaced radial faces of said bar magnet to resist relative rotation therebetween.

6. An improved magnet shaft assembly for use in rotating a speedometer speed cup having a rim wall, comprising a metal flux collector having an annular portion spaced radially outwardly of said speed cup rim wall and a radial wall having an axially offset wall portion, a bar magnet spaced radially inwardly of said speed cup rim wall and engaged with said flux collector radial wall, a molded plastic magnet shaft extending through said flux collector radial wall and said magnet and in molded engagement with said magnet to resist movement therebetween, a radially extending wall integrally formed on said magnet shaft and in molded engagement with said flux collector axially offset wall portion to resist relative rotation therebetween, and an annular wall portion integrally formed on said magnet shaft radial wall and in molded engagement with said flux collector annular portion, said magnet shaft having an integrally formed radial wall in engagement with said magnet at a position spaced axially from the engaged flux collector radial wall and magnet.

7. An improved magnet shaft assembly for operating a vehicle speedometer having a pointer shaft carrying a speed cup including a rim wall, comprising a plastic magnet shaft having a noncircular opening formed in one end of said shaft for receiving a rotating correspondingly shaped element, metal flux collector having an axially extending wall spaced radially outwardly of said speed cup rim wall, an annular plastic wall having an axially extending wall on said collector wall and an integrally formed radial wall portion integrally interconnected with said magnet shaft adjacent the opposite magnet shaft end and secured to said flux collector to secure said flux collector to said magnet shaft, a bar magnet having a first pair of axially spaced walls with said opposite shaft end passing through said bar magnet axially spaced walls toward said speed cup rim wall, a recess in said opposite magnet shaft end for receiving said pointer shaft, and a radial wall integrally formed on said opposite magnet shaft end in engagement with one of said bar magnet axially spaced walls for preventing axial movement in one direction of said magnet shaft relative said magnet shaft.

8. The magnet shaft assembly claimed in claim 7 in which said flux collector includes a radial wall terminating at the other bar magnet axially spaced wall.

9. The magnet shaft assembly claimed in claim 8 in which said flux collector radial wall has an axially offset portion in overlapping axial engagement with said bar magnet.

10. The magnet shaft assembly claimed in claim 7 in which a helical gear is integrally molded on said annular plastic wall.

11. An improved combination speedometer and odometer including a pointer shaft having a speed cup for rotating a pointer to indicate vehicle speed and an odometer having a pinion gear for rotating a plurality of dials to indicate distance traveled, comprising a U-shaped frame bracket having a back wall in which an opening is formed, a bearing boss secured to said back wall, a plastic magnet shaft rotatably supported in said bearing boss and having a noncircular opening formed in one end of said magnet shaft for receiving a rotatable member to rotate said magnet shaft and another end passing through said back wall opening, a metal flux collector having an annular wall portion, an annular plastic wall portion integrally formed on said magnet shaft other end and molded around said flux collector annular wall portion to secure said collector to said magnet shaft in a position encircling said speed cup, a gear tooth integrally formed on the periphery of said annular plastic wall for rotating said odometer pinion gear in response to rotation of said magnet shaft, a bar magnet having opposite ends spaced radially inwardly of said speed cup, said magnet shaft opposite end projecting through said bar magnet and having a recess therein for receiving one end of said pointer shaft, and an integrally formed wall on the projecting end of said magnet shaft engaging said bar magnet to prevent axial movement of said bar magnet in one direction.

12. An improved combination speedometer and odometer including a pointer shaft having a speed cup for rotating a pointer to indicate vehicle speed and an odometer having a pinion gear for rotating a plurality of dials to indicate distance traveled, comprising a U-shaped frame bracket having a back wall in which an opening is formed, a bearing boss secured to said back wall, a plastic magnet shaft rotatably supported in said bearing boss and having a noncircular opening formed in one end of said magnet shaft for receiving a rotatable member to rotate said magnet shaft and another end passing through said back wall opening, a metal flux collector havinng an annular wall portion, an annular plastic wall portion integrally formed on said magnet shaft other end and molded around said flux collector annular wall portion to secure said collector to said magnet shaft in a position encircling said speed cup, a gear tooth integrally formed on the periphery of said annular plastic wall for rotating said odometer pinion gear in response to rotation of said magnet shaft, a bar magnet having opposite ends spaced radially inwardly of said speed cup, said magnet shaft opposite end projecting through said bar magnet and having a recess therein for receiving one end of said pointer shaft, and an integrally formed wall on the projecting end of said magnet shaft engaging said bar magnet to prevent axial movement of said bar magnet in one direction, said magnet shaft having a peripheral groove for receiving an edge portion of said back wall opening.

* * * * *